United States Patent
Jackwerth et al.

(10) Patent No.: US 8,813,931 B2
(45) Date of Patent: Aug. 26, 2014

(54) FREE-WHEEL CAGE RING WITH CENTRIFUGAL-FORCE LIFTING

(75) Inventors: Siegfried Jackwerth, Taunus (DE); Karlheinz Timtner, Bad Homburg v.d. Höhe (DE); Ruprecht Maurer, Bad Homburg v.d. Höhe (DE)

(73) Assignee: RINGSPANN GmbH, Bad Homburg (DE)

(*) Notice: Subject to any disclaimer, the term of this patent is extended or adjusted under 35 U.S.C. 154(b) by 369 days.

(21) Appl. No.: 12/823,219

(22) Filed: Jun. 25, 2010

(65) Prior Publication Data

US 2010/0326783 A1  Dec. 30, 2010

(30) Foreign Application Priority Data

Jun. 25, 2009  (DE) .......................... 10 2009 030 614

(51) Int. Cl.
  *F16D 41/07*  (2006.01)
(52) U.S. Cl.
  USPC .......................... 192/45.1; 192/41 A; 188/82.8
(58) Field of Classification Search
  USPC .......................... 192/45.1; 188/82.8
  See application file for complete search history.

(56) References Cited

U.S. PATENT DOCUMENTS

| 3,702,649 A | * | 11/1972 | Giese et al. ................. 192/41 A |
| 4,522,289 A | * | 6/1985 | Giese et al. ................. 192/41 A |
| 5,645,149 A | * | 7/1997 | Maurer et al. ............... 192/45.1 |

FOREIGN PATENT DOCUMENTS

| DE | 2004457 | 8/1971 |
| DE | 2014055 | 10/1971 |
| DE | 2551248 | 5/1977 |
| DE | 4424217 | 1/1996 |
| DE | 443723 | 6/1996 |
| DE | 4443723 | 6/1996 |
| DE | 19919377 | 10/2000 |
| DE | 19640608 | 6/2008 |

\* cited by examiner

*Primary Examiner* — Richard M. Lorence
*Assistant Examiner* — Lillian Nguyen
(74) *Attorney, Agent, or Firm* — Volpe and Koenig, P.C.

(57) ABSTRACT

A free-wheel cage ring, having two annular flanged disks that extend radially and are connected to each other to form an axial intermediate space and have clamping bodies therebetween pivotally arranged in the cage ring and are biased for coupling by a spring, the clamping bodies perform, due to centrifugal force, a pivoting motion for decoupling against the spring force, and at least two guide surfaces are allocated to each clamping body in its axial extent, that engage opposite end peripheral regions of the clamping body, guide them at least in the peripheral direction, and have a break through which the clamping bodies extend to a radially inner clamping surface. The axial length of the clamping body radially inner clamping surface is equal to the total length of the clamping body. The guide surfaces are each formed integrally by recesses on opposite end faces of the flanged disks.

13 Claims, 3 Drawing Sheets

FREE-WHEEL CAGE RING WITH CENTRIFUGAL-FORCE LIFTING

CROSS-REFERENCE TO RELATED APPLICATIONS

This application claims the benefit of German Patent Application No. 10 2009 030 614.5-12, filed Jun. 25, 2009, which is incorporated herein by reference as if fully set forth.

BACKGROUND

The invention relates to a free-wheel cage ring comprising two annular flanged disks that extend essentially in the radial direction and that are connected to each other to provide the formation of an axial intermediate space and that have, between themselves, a plurality of clamping bodies that are arranged so that they can pivot in the cage ring and that are biased by at least one spring in the coupling sense, wherein the clamping bodies carry out a pivoting motion acting in the decoupling sense against the spring force under the action of centrifugal force. In its axial extent, at least two guide surfaces are allocated to each clamping body, wherein these guide surfaces engage opposite end peripheral regions of the clamping body and guide the clamping body at least in the peripheral direction of the flanged disks.

For the case of clamping body free-wheels with centrifugal-force lifting, it is known that the cage ring rotates with no load together with the free-wheel outer ring, while the free-wheel inner ring is stationary. Here, the clamping bodies are pressed outward by the centrifugal force acting on them, pivoted in the decoupling sense, and therefore lifted from the free-ring inner ring. Here, the clamping body center of gravity is offset relative to the clamping body pivot axis in the peripheral direction so that, when pivoting in the decoupling sense, the center of gravity moved outward. Because the cage ring rotates in sync with the free-wheel outer ring, any wear in the no-load state is excluded, as long as the rotational speed required for centrifugal-force lifting is exceeded. This therefore has considerable importance, because slight material abrasion on the clamping bodies can lead to interrupted functioning due to non-uniform engagement and finally to failure of the free-wheel with dangerous consequences for the operating personnel.

Through DE-A 20 04 457, however, it is also known to lift the clamping bodies in the no-load state not from the inner ring, but instead from the outer ring. This alternative is then required when the free-wheel inner ring rotates in the no-load operation, while the outer ring is stationary. For this purpose, the center of gravity of the clamping body must be displaced relative to the clamping body pivoting axis, such that the pivoting motion in the decoupling sense leads to a lifting of the clamping body from the free-wheel outer ring. Because the support of the clamping body relative to the effect of the centrifugal force can no longer be realized by the outer ring in this case, they are supported, in the known case, on a concentric support ring that is connected with a friction fit to the free-wheel inner ring. This support ring can also be formed by inward-bending bends of the two flanged disks of the cage ring.

As one refinement, it is known through DE 44 43 723 from which the present application originates that two separately produced pockets are allocated to each clamping body in its axial extent, wherein these pockets provide a contact on opposite ends of the clamping body for its guidance. These pockets are typically connected to the flanged disks by welding. At least two guide surfaces that provide contacts on opposite end peripheral regions of the clamping body are allocated on the pockets to each clamping body in its axial extent. These guide surfaces guide the clamping body at least in the peripheral direction of the flanged disks and have a radially inner and also a radially outer break through which the clamping bodies extend to a radially inner or radially outer clamping surface.

One essential feature of a free-wheel cage ring is the axial length of the clamping body clamping surfaces. This is because, with increasing axial length of the clamping surfaces, the maximum torque that can be transferred by the free wheel between the inner and outer parts increases. This applies especially for the radially inner clamping surface, because the Hertzian pressure ratio is less favorable there.

SUMMARY

The present invention is therefore based on the objective of further improving the known free-wheel cage ring, in order to increase the maximum transferable torque for the same installation space of the free-wheel cage ring and to use the expensive clamping body profile material in the best possible way. Furthermore, the free-wheel cage ring should be distinguished by increased robustness, especially of the guide surfaces, further increase in the accuracy of the positioning of the clamping body within the flanged disks, and also by simplified and more economical production.

This objective is met by a free-wheel cage ring according to the invention. Advantageous constructions of the free-wheel cage ring according to the invention are described in detail below and in the claims.

For the case of the free-wheel cage ring according to the invention, the guide surfaces that contact opposite end peripheral regions of the clamping body and that guide the clamping body at least in the peripheral direction of the flanged disks are no longer formed by separate pockets as before, but instead are formed directly integrally by recesses on opposite ends of the flanged disks.

Therefore, separately produced pockets for guiding the clamping bodies can be eliminated and the time-intensive adjustment and mounting of the pockets on the flanged disks is eliminated.

In addition, an especially exact and robust construction of the guide surfaces is produced, especially with respect to the guidance of the clamping bodies in the peripheral direction of the flanged disks. Through the integral construction it is further possible to produce flanged disks and guide surfaces by turning and milling processes with the same machine tool without shifting the tool. Therefore, on one hand, the production process is simplified and is thus more economical and, on the other hand, the accuracy of the positioning of the guide surfaces on the flanged disks increases.

In addition, the maximum transferable torque increases while the installation space of the free-wheel cage ring remains the same; this relates to the following background: One essential factor for the maximum transferable torque is the axial length of the clamping surfaces of the clamping body, especially the radially inner clamping surfaces. Through the construction of the guide surfaces integrally with the flanged disks, in comparison with the known prior art, separate pockets are eliminated, so that, in particular, also a parallel base region of the pockets contacting the ends of the flanged disks is eliminated. In this way, in comparison with a free-wheel cage ring with separate pockets, for the same axial overall length of the cage ring, the use of longer clamping bodies, i.e., clamping bodies with a greater axial length of the clamping surface is possible, so that a higher maximum torque can also be transferred.

For the case of typical free-wheel cage rings, the present invention allows an increase in the axial length of the clamping surfaces by 6 to 8 mm. This produces an increase in the maximum transferable torque between 10% and 20% for typical free-wheel cage rings.

The axial length of the radially inner clamping surface of a clamping body is equal to the total length of the clamping body. In this way, the expensive clamping body profile material is used in the best possible way for torque transfer.

The integral construction of the guide surfaces on the flanged disks further allows a tighter arrangement of the clamping bodies, so that, for the same diameter of the free-wheel cage ring, a larger number of clamping bodies can be installed and the maximum transferable torque can be further increased.

The guide surfaces on opposite ring surfaces of the flanged disks are advantageously formed by cutting, advantageously by milling.

In one advantageous construction of the free-wheel cage ring according to the invention, at least two guide surfaces are allocated to each clamping body on each of the two end peripheral regions, wherein these guide surfaces form a break on the radially outer side and a break on the radially inner side. For the case of this advantageous embodiment, the guide surfaces are constructed differently, so that the corresponding peripheral surfaces in the end regions of the clamping body can be allocated to different radii for the different guide surfaces. Likewise, in an already known way, the construction of a radially outer shoulder on the flanged disks is possible on which an end peripheral surface of the clamping body allocated to the shoulder is supported, in order to achieve centrifugal force lifting as described above.

The processing of the flanged disks by means of turning is more economical in comparison with processing by means of separate point-by-point milling or boring processes. Therefore, in one additionally advantageous construction, the previously named, at least two guide surfaces extend in the radial direction at a maximum only across half, advantageously at a maximum across one-third of the radial width of the flanged disk. In this way, the milling or boring work is reduced.

In particular, it is advantageous that the two guide surfaces allocated to an end peripheral region on the flanged disk are each shorter than the allocated end peripheral surfaces on the end of the clamping body. In this way, the percentage of milling or boring work on the flanged disks is also further reduced.

It is especially advantageous when the flanged disks each have a narrow, concentric collar on their facing ends and the guide surfaces are formed by recesses in the collars. This is because the concentric collars can be produced through simple turning of the flanged disks.

In another advantageous construction, a continuous guide surface is allocated to each clamping body on opposite end peripheral regions, wherein this guide surface has a circular construction with a break on the radially inner side. This circular guide surface can be produced with high accuracy and economically by a borehole or cutout.

Advantageously, each break arranged on the radially inner side is shorter in the peripheral direction than the maximum cross section of the clamping body in the end region of the clamping body allocated to this break. In this way, the clamping body is prevented from falling radially inward, while falling radially outward is prevented by an axially inward projecting shoulder of the flanged disk or by a circular guide surface.

The axial wall thickness of the flanged disks in the regions opposite the ends of the clamping bodies advantageously lies between 3 mm and 20 mm. In this way, an optimum result is achieved between stability of the free-wheel cage ring on one hand and an increase in the axial length of the clamping surfaces of the clamping body, in particular, on the radially inner side.

For holding the springs, pockets are formed advantageously in the flanged disk and/or in the end region of the clamping body.

In particular, it is advantageous to form spring pockets in the flanged disk. Advantageously, the axial wall thickness of the flanged disks in the region of the spring pockets equals between 0.2 mm and 1 mm, advantageously, for example, 0.5 mm.

The spring is advantageously constructed as a leg spring that is supported with one leg on the clamping body and with the other leg on a corresponding recess in the pocket.

In another advantageous embodiment, the leg spring is constructed such that both spring legs carry out their pivoting motion in the same pivot plane perpendicular to the cylinder axis. In this way, the construction of a separate recess in the pocket for the spring for holding and supporting a spring leg can be eliminated, which further simplifies the production process.

In this advantageous construction, one spring leg is supported on the clamping body and the other spring leg is supported on a support surface outside of the spring pocket on the flanged disk. This can be a separately formed support surface or a shoulder of the flanged disk.

In order to be able to arrange both spring legs in the same plane, it is advantageous that one of the spring legs is guided outside of or inside of the spring coil to the pivot plane of the other spring leg.

The clamping body can have, in a known way, a stop pin that contacts a stop surface of the flanged disk at the maximum rotation of the clamping body in the decoupling sense. In this way, a limit to the rotational motion, generated by the centrifugal force in the free-wheeling operation, is guaranteed, so that touching of the clamping body on the outer ring track in the free-wheeling operation is avoided.

Advantageously, a stop for the clamping body is also and/or alternatively formed on the flanged disk at the maximum rotation in the decoupling sense.

The connection of the flanged disks is realized advantageously by several axial connection bolts.

Furthermore, it is advantageous to construct the free-wheel cage according to the invention so that the outer surfaces of the flanged disks have no openings. In this way it is achieved that the free-wheel cage is not sensitive to damage or contaminants. In particular, it is advantageous when the outer surfaces of the flanged disks are constructed essentially as flat surfaces.

BRIEF DESCRIPTION OF THE DRAWINGS

Additional features and advantageous constructions of the invention are given from the embodiments described below and the accompanying figures, wherein

FIGS. 1 and 6: perspective views of a partially broken-away cage ring partially equipped with clamping bodies according to a first and second alternative, respectively;

FIGS. 2 and 7: enlarged radial sections through a flanged disk according to the section line II-II in FIG. 3 and VII-VII in FIG. 8, respectively;

FIGS. 3 and 8: axial section views through the free-wheel cage ring according to the section line III-III in FIG. 2 and the section line VIII-VIII in FIG. 7, respectively;

FIGS. 4 and 9: perspective views of a partial cutout of the inner end of the flanged disk with inserted spring;

FIGS. 5 and 10: cross sectional views through a clamping body according to FIG. 1 and FIG. 6, respectively;

DETAILED DESCRIPTION OF THE PREFERRED EMBODIMENTS

FIGS. 1 to 5 show a first embodiment of a free-wheel cage ring according to the invention. Two annular flanged disks 1 and 2 are connected to each other in parallel and concentrically by several axial connection bolts 3. Each connection bolt 3 comprises two spring-mounted points 3a, 3b that are used for synchronizing the cage ring with a not-shown free-wheel inner ring.

Figure 1:
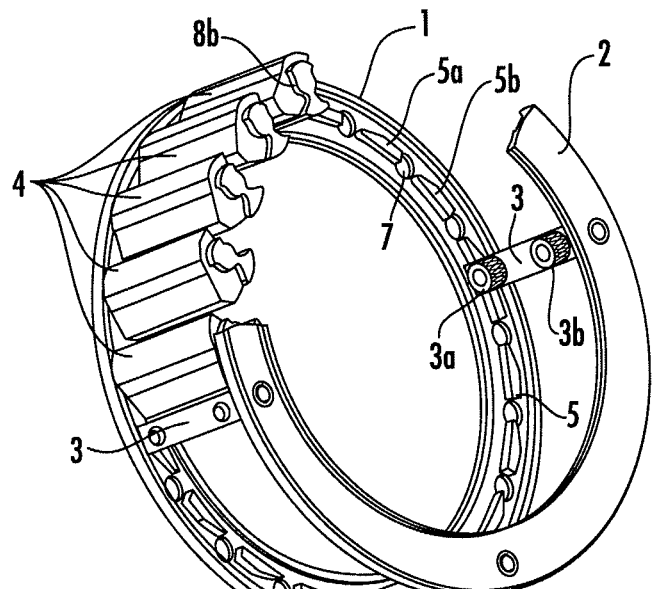
FIGS. 1 to 5 are assigned to a first embodiment and FIGS. 6 to 10 are assigned to a second embodiment of the free-wheel cage ring according to the invention. Shown are.

Between the flanged disks there is a plurality of clamping bodies 4, wherein, in FIG. 1, for the sake of clarity, only the clamping bodies in the top left quarter of the free-wheel cage ring are shown.

The flanged disks each have, on their facing ends, a concentric collar 5 that is broken by recesses for forming guide surfaces. As an example, in FIGS. 1, 2, and 4, two remaining webs of the collar 5 are designated with the reference symbols 5a and 5b. Between the webs, guide surfaces (5c and 5d in FIG. 4) are formed by recesses that guide the clamping bodies in the peripheral direction of the flanged disks.

Figure 5:
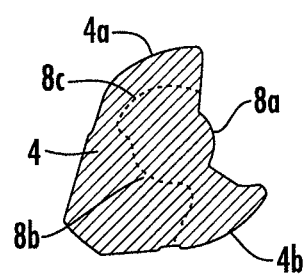
Figure 6:
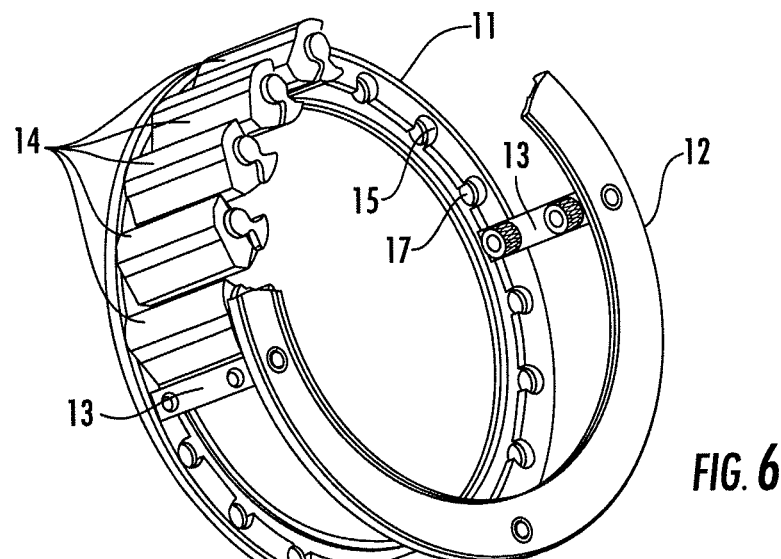

As can be seen in FIG. 5, each clamping body has axially projecting, end peripheral regions 8a and 8b, wherein, in the installed state, the guide surface 5d contacts the peripheral region 8a and the guide surface 5c contacts the peripheral region 8b. Furthermore, the flanged disks each have, in a radially outer position, a shoulder 1a, 2a to which is allocated an end peripheral region 8c of the clamping body 4. The peripheral region 8c stands axially just as far forward as the peripheral regions 8a and 8b.

Between the webs 5a and 5b there are pockets 7 for holding leg springs 6. The leg springs 6 are thus each arranged on the ends of the clamping body 4 and load these in the decoupling sense, so that the radially outer clamping surface 4a and the radially inner clamping surface 4b of the clamping body 4 are braced on corresponding counter surfaces of a not-shown outer or inner ring when the inner and outer ring want to rotate in the coupling direction. In contrast, for rotation from the inner ring to the outer ring in the free-wheel direction, the radial bracing is lifted.

The shape of the clamping body 4 and the peripheral regions 8a, 8b, and 8c is selected such that, when the free-wheel cage ring is carried along by the inner ring in the free-wheel direction, the clamping bodies are supported with the peripheral region (8c) on the radially inner side of the shoulder 1a against the centrifugal force. In this way, a pivoting motion of the clamping bodies is produced that lifts them from the outer ring.

Figure 2:
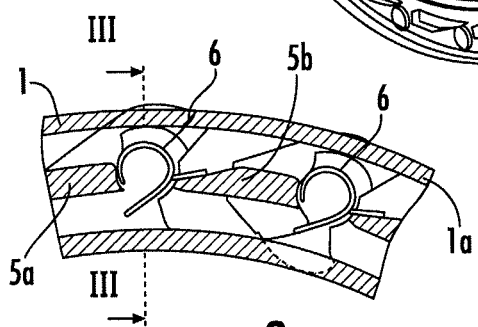
Figure 3:
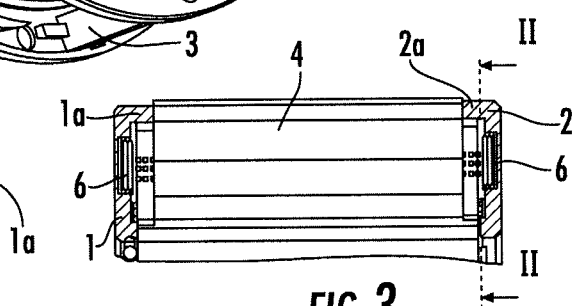
Figure 4:
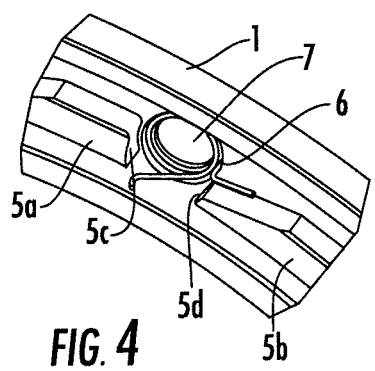

FIG. 3 shows a section through the free-wheel cage ring along the section line III-III in FIG. 2. The support of the clamping body 4 on the shoulder 1a of the flanged disk 1 and the shoulder 2a of the flanged disk 2 by the end peripheral surfaces 8c can be seen. Furthermore, it can be seen that the coils of the leg springs 6 extend into the pockets formed in the flanged disks 1 and 2. As can be seen in FIG. 4, a spring leg contacts a contact surface provided for this purpose on the collar formed in the flanged disk 1. The other spring leg extends in the same pivot plane and is bent at a right angle merely at the end, as shown in FIG. 2, in order to come into engagement with the clamping body 4.

Furthermore, in FIG. 1 and in FIG. 5 it can be seen that the end of the clamping body 4 starting from the axially projecting region within the peripheral surfaces 8a, 8b, and 8c extends without rebound up to the radially inner clamping surface 4b of the clamping body. In this way it is guaranteed that, at least with respect to the radially inner clamping surfaces, the axial clamping surface length is maximized for a given axial overall length of the free-wheel cage ring with corresponding maximization of the transferable torque. In addition, optimum use of the expensive profile material used for the clamping bodies is realized.

FIGS. 6 to 10 show a second embodiment of a free-wheel cage ring according to the invention. The basic construction is the same as the embodiment shown in FIGS. 1 to 5.

Two flanged disks 11, 12 are connected to each other by connection bolts 13 and a plurality of clamping bodies 14 following one after the other in the peripheral direction are supported so that they can pivot between the flanged disks.

Figure 7:
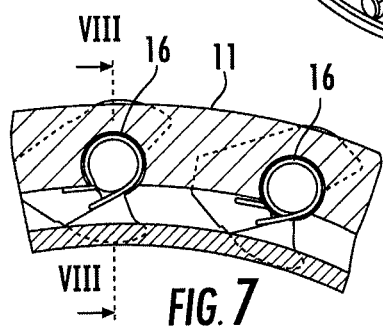
Figure 9:
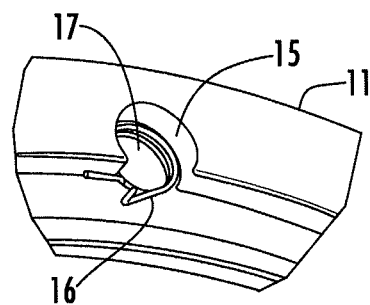

In contrast to the embodiment shown in FIGS. 1 to 5, the second embodiment works with flanged disks 11 and 12 that have circular guide surfaces 15 with a radially inner opening, as shown in FIGS. 7 and 9.

Figure 10:
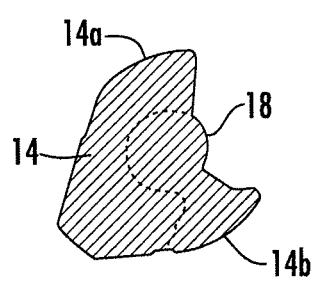

As can be seen in FIG. 10, the clamping body 14 has only one circular, end peripheral region 18 that comprises the same peripheral regions 8a and 8b of the clamping body 4, while the peripheral region 8c has been displaced to the same radius as the peripheral regions 8a and 8b. The end of the clamping body also extends here without rebound starting from the end peripheral region 18 to a radially inner clamping surface 14b.

Accordingly, the recesses in the flanged disks 11, 12 have only one circle-cylindrical guide surface 15 that is broken on the radially inner side.

As in the first embodiment, pockets 17 for holding leg springs 16 are formed within the recesses in the flanged disks. According to FIG. 9, one spring leg here contacts a shoulder that lies radially inside relative to the recess and the other spring leg also has a right-angle bent just like in the first embodiment, in order to come into contact with the clamping body 14.

Figure 8:
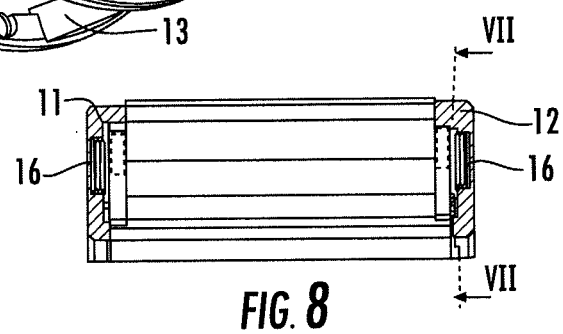

In FIG. 8, a section according to line VIII-VIII in FIG. 7 is shown in which the storage of windings of the leg springs 16 in the pockets formed in the flanged disks can be seen.

Figure 11:
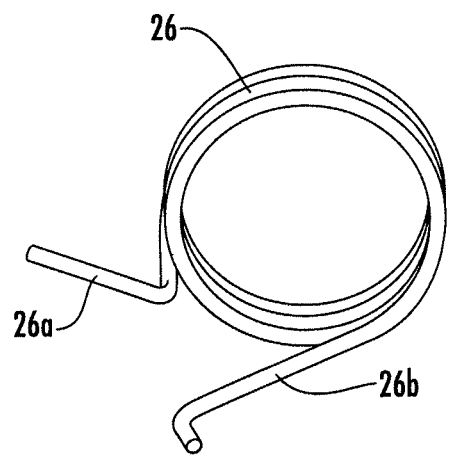
FIG. 11: a first embodiment of a leg spring in which one spring leg is directed outside of the cylindrical coil.
Figure 12:
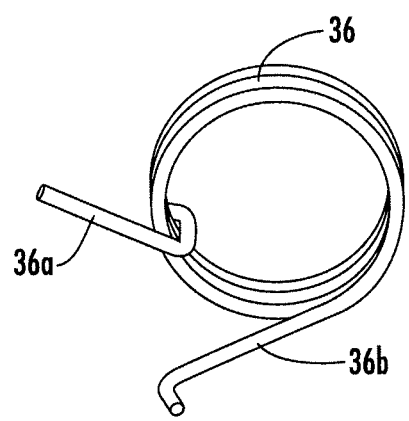
FIG. 12: a second embodiment of a leg spring in which one spring leg is guided within the cylindrical spring coil.

FIGS. 11 and 12 show two advantageous constructions of the leg springs for use in the free-wheel cage ring according to the invention, wherein both spring legs have a common pivot plane:

Here, as shown in FIG. 11, one spring leg 26a of a leg spring can be guided outside of the spring coils perpendicular to the spring coils up to the pivot plane of the other spring leg 26b, so that both spring legs have the same pivot plane.

It is advantageous to construct the leg springs according to FIG. 12. Here, for one leg spring 36, a spring leg 36a is guided on the inside of the spring coils perpendicular to the spring coils up to the pivot plane of the other spring leg 36b. Here, both spring legs also have the same pivot plane.

Figure 13:
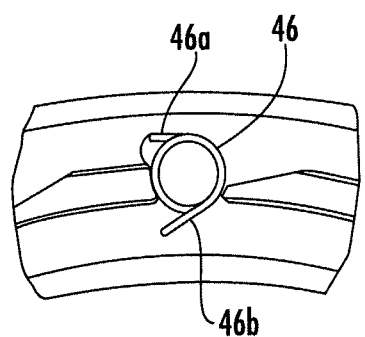
FIG. 13: an enlarged cutout of the inner end of a flanged disk in which a spring pocket is constructed with a recess for insertion of a conventional leg spring.

Alternatively, the use of already known cylindrical leg springs is also possible for the free-wheel cage ring according to the invention. As shown in FIG. 13, for this purpose, in the pocket for holding a leg spring 46, an additional recess is formed for holding a first spring leg 46a. The spring leg 46a is thus supported on the edge of this additional recess and does not lie in the pivot plane of the second spring leg 46b.

The invention claimed is:

1. A free-wheel cage ring, comprising two annular flanged disks (1, 2; 11, 12) that extend essentially in a radial direction and that are connected to each other and form an axial intermediate space, the flanged disks (1, 2; 11, 12) each having, on a respective facing end, a concentric collar (5) that is broken by recesses to form at least two guide surfaces facing the recesses, a plurality of clamping bodies (4; 14) that are located between the disks and arranged so that they can pivot in the cage ring and that are biased in a coupling sense by at least one leg spring (6; 16; 26; 36), the clamping bodies (4; 14) perform, under the effect of a centrifugal force, a pivoting motion acting in a decoupling sense against a spring force, wherein the guide surfaces (5c, 5d; 15) are spaced apart from inner and outer flanges of the disks, with two of the guide surfaces being allocated to each of the clamping bodies (4, 14) in an axial extent, one of the guide surfaces engages each opposite end peripheral region of each of the clamping bodies (4; 14), to guide them at least in a peripheral direction of the flanged disks (1, 2; 11, 12), and the collar has a break at least on a radially inner side through which the clamping bodies extend, an axial length of a radially inner clamping surface of each of the clamping bodies is equal to a total length of each of the clamping bodies, and the guide surfaces (5c, 5d; 15) are each formed integrally in the flanged disks by the recesses located on opposite end faces of the flanged disks (1, 2; 11, 12).

2. The free-wheel cage ring according to claim 1, wherein outer surfaces of the flanged disks (1, 2, 11, 12) have no openings.

3. The free-wheel cage ring according to claim 1, wherein the guide surface allocated to each of the opposite end peripheral regions of each of the clamping bodies comprises at least two guide surfaces that are formed by a break on the radially outer side of the collar and the break on the radially inner side of the collar.

4. The free-wheel cage ring according to claim 3, wherein the guide surfaces (5c, 5d) extend in the radial direction at a maximum across half of a radial width of the flanged disk.

5. The free-wheel cage ring according to claim 4, wherein the guide surfaces (5c, 5d) are each shorter than allocated arc lengths of the end peripheral regions (8a, 8b) of each of the clamping bodies (4).

6. The free-wheel cage ring according to claim 3, wherein the flanged disks (1, 2) each have a shoulder (1a, 2a) at a radially outer location and an end peripheral region (8a, 8b, 8c) of the clamping body (4) is allocated to the shoulder.

7. The free-wheel cage ring according to claim 3, wherein each of the breaks arranged on the radially inner side is shorter in the peripheral direction than a maximum cross section of the clamping body (4; 14) in an end region of the clamping body (4; 14) allocated to the break.

8. The free-wheel cage ring according to claim 1, wherein the guide surfaces (5c, 5d; 15) are cut into the flanged disks (1, 2, 11, 12).

9. The free-wheel cage ring according to claim 1, wherein pockets (7; 17) are constructed for holding leg springs (6; 16; 26; 36) in at least one of the flanged disk or in the end region of the clamping body (4; 14).

10. The free-wheel cage ring according to claim 1, wherein the springs (6; 16; 26; 36) are leg springs with two spring legs.

11. The free-wheel cage ring according claim 10, wherein one of the spring legs is guided inside or outside of the spring coil perpendicular to the pivoting axis of the clamping body in the same pivoting plane as the other spring leg.

12. The free-wheel cage ring according to claim 1, wherein a maximum rotation of each of the clamping bodies (4; 14) is limited relative to the flanged disk (1, 2; 11, 12) in the decoupling sense by a stop on the clamping body.

13. The free-wheel cage ring according to claim 1, wherein a stop for the clamping body (4; 14) is formed on the flanged disk at a maximum rotation in the decoupling sense.

\* \* \* \* \*